(12) United States Patent
Kato et al.

(10) Patent No.: US 12,468,053 B2
(45) Date of Patent: Nov. 11, 2025

(54) RADIATION DETECTION APPARATUS

(71) Applicant: CANON KABUSHIKI KAISHA, Tokyo (JP)

(72) Inventors: Satoshi Kato, Kanagawa (JP); Masanobu Ohmura, Kanagawa (JP); Tatsuya Ryoki, Kanagawa (JP); Takanori Yamashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 18/316,382

(22) Filed: May 12, 2023

(65) Prior Publication Data
US 2024/0302545 A1 Sep. 12, 2024

(30) Foreign Application Priority Data
Mar. 7, 2023 (JP) ................. 2023-034569

(51) Int. Cl.
G01N 23/00 (2006.01)
G01N 23/046 (2018.01)
G01N 23/083 (2018.01)
G01T 1/24 (2006.01)

(52) U.S. Cl.
CPC ............. G01T 1/24 (2013.01); G01N 23/046 (2013.01); G01N 23/083 (2013.01)

(58) Field of Classification Search
CPC ..... A61B 6/032; A61B 6/4233; A61B 6/4266; A61B 6/4429; G01N 23/046; G01N 23/083; G01T 1/24
See application file for complete search history.

(56) References Cited

U.S. PATENT DOCUMENTS

| | | | |
|---|---|---|---|
| 2005/0139757 A1 | 6/2005 | Iwanczyk et al. | |
| 2012/0133001 A1 | 5/2012 | Tkaczyk et al. | |
| 2019/0280036 A1* | 9/2019 | Herrmann | H10F 39/804 |
| 2019/0339402 A1 | 11/2019 | Crestani et al. | |
| 2022/0359128 A1* | 11/2022 | Tedde | H01G 9/0036 |

FOREIGN PATENT DOCUMENTS

| | | |
|---|---|---|
| JP | 2007-524234 A | 8/2007 |
| JP | 2012-118060 A | 6/2012 |
| JP | 2019-523402 A | 8/2019 |
| WO | 2005/065333 A2 | 7/2005 |
| WO | 2018/011399 A1 | 1/2018 |

* cited by examiner

*Primary Examiner* — Dani Fox
(74) *Attorney, Agent, or Firm* — Venable LLP

(57) ABSTRACT

A radiation detection apparatus according to the present invention includes: a direct-detection-type radiation detector provided in plurality and configured to be arranged in a planar manner; and a semiconductor integrated circuit configured to perform a control operation of the radiation detector or processing on a signal from the radiation detector, wherein the semiconductor integrated circuit is disposed on a back side of the light-receiving surface so as to be included within an area of the radiation detector in a plan view viewed from a side of a light-receiving surface of the radiation detector.

11 Claims, 5 Drawing Sheets

RADIATION DETECTION APPARATUS

BACKGROUND OF THE INVENTION

Field of the Invention

The present invention relates to a radiation detection apparatus.

Description of the Related Art

An X-ray detection method in which X-rays are indirectly detected has been proposed. In this method, X-rays are incident on a scintillator (phosphor) to be converted into visible light, and the converted visible light is incident on a single-crystal semiconductor substrate so as to detect the X-rays. In addition to the above method, there has been proposed another X-ray detection method in which X-rays are directly incident on a single-crystal semiconductor substrate to be detected. Compared to the former method (indirect detection method), the latter method (direct detection method) is not affected by scattered light since this method uses no scintillator. Thus, an X-ray detection image with high sharpness can be obtained.

In a radiation detector employing the indirect detection method, a certain amount of X-rays is not converted and passes through, whereas transmission of X-rays is controlled in a radiation detector employing the direct detection method. Therefore, a semiconductor integrated circuit that performs various kinds of control operations and signal processing may be disposed on a back side of a light-receiving surface of the radiation detector employing the direct detection method.

U.S. Patent Application Publication No. 2019/0339402 (Specification) discloses a radiation detection apparatus in which a plurality of radiation detectors are arranged (tiled), and a semiconductor integrated circuit such as an application-specific integrated circuit (ASIC) is disposed on a back side of a light-receiving surface of the radiation detector.

SUMMARY OF THE INVENTION

The radiation detection apparatus of the present invention includes: a direct-detection-type radiation detector provided in plurality and configured to be arranged in a planar manner; and a semiconductor integrated circuit configured to perform a control operation of the radiation detector or processing on a signal from the radiation detector, wherein the semiconductor integrated circuit is disposed on a back side of the light-receiving surface so as to be included within an area of the radiation detector in a plan view viewed from a side of a light-receiving surface of the radiation detector.

An X-ray computed tomography apparatus of the present invention includes: an X-ray generation unit; the above-mentioned radiation detection apparatus configured to detect X-rays emitted from the X-ray generation unit; and a signal processing unit configured to process a signal output from the radiation detection apparatus.

Further features of the present invention will become apparent from the following description of exemplary embodiments with reference to the attached drawings.

DESCRIPTION OF THE EMBODIMENTS

When a plurality of radiation detectors (chips) are tiled, radiation leaking from the boundaries between the chips and peripheries of the chips may degrade components disposed on the back side of the light-receiving surface and cause a failure. In the technique described in U.S. Patent Application Publication No. 2019/0339402 (Specification), the ASIC is disposed across two chips and may be degraded by radiation leaking from the boundary between the chips.

It is an object of the present disclosure to provide a radiation detection apparatus that reduces degradation and failures of the component due to exposure to radiation.

Embodiment 1

Hereinafter, embodiments of the present invention will be described. A radiation detector according to the present embodiment is an element (chip) that employs a method in which radiation such as X-rays or gamma rays is directly incident on a single-crystal semiconductor substrate to be detected. Hereinafter, this method will be referred to as a "direct detection type". The single-crystal semiconductor substrate of the direct-detection-type radiation detector is formed of, for example, a single crystal of a cadmium zinc telluride (CdZnTe: $Cd_{1-x}Zn_xTe$ (x is, for example, 0.5 or less)) semiconductor, which is an alloy of cadmium telluride CdTe and zinc telluride ZnTe. A $Cd_{1-x}Zn_xTe$ semiconductor is also referred to as CZT. In the present embodiment, CZT will be mainly described. However, the present invention is not limited to this embodiment and can be applied to any single-crystal semiconductor substrate capable of directly detecting X-rays. For example, the present invention can be applied to a single-crystal semiconductor substrate that includes cadmium telluride CdTe, lead iodide $PbI_2$, mercuric iodide $HgI_2$, bismuth iodide $BiI_3$, thallium bromide TlBr, or the like.

When a radiation detection apparatus is configured by using the radiation detector according to the present embodiment, the radiation detector is arranged in plurality in a planar manner (a plurality of radiation detectors are tiled). The arrangement pattern of the plurality of radiation detectors is not particularly limited. For example, the plurality of radiation detectors are arranged in a matrix (in a row direction and a column direction). A member that includes a plurality of radiation detectors arranged in the row direction and a semiconductor integrated circuit or the like bonded to these radiation detectors is hereinafter referred to as a detector unit. The radiation detection apparatus is configured by arranging detector units in the column direction.

Figure 1A:
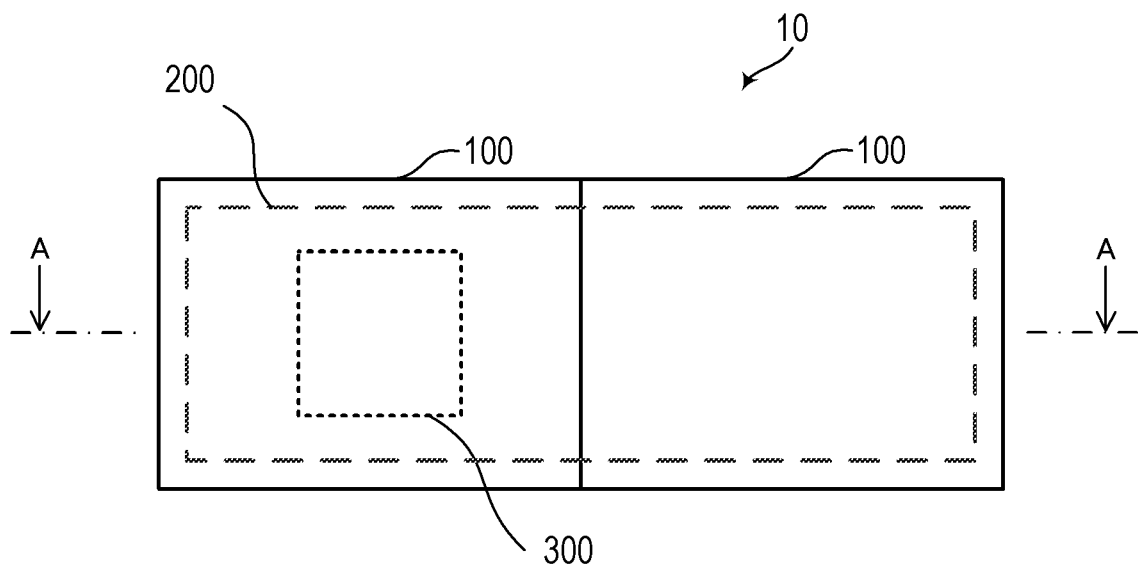
FIGS. 1A and 1B are schematic diagrams illustrating a configuration example of a detector unit according to Embodiment 1.
Figure 1B:
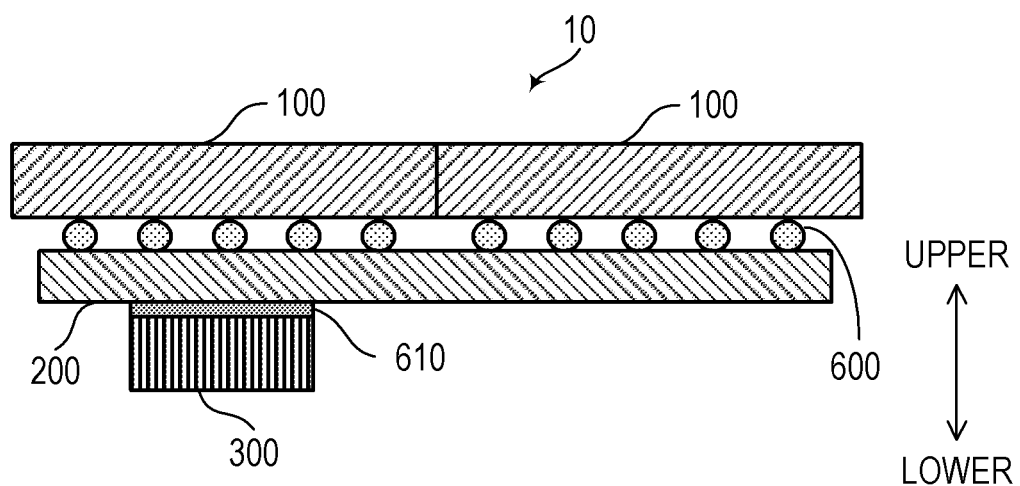

FIGS. 1A and 1B are schematic diagrams illustrating a configuration example of a detector unit 10 according to Embodiment 1. FIG. 1A is an upper surface view of the detector unit 10. FIG. 1B is a sectional view of the detector unit 10, taken along a line A-A in FIG. 1A. The detector unit 10 includes at least two radiation detectors 100, a substrate 200, and an ASIC 300. In the following description, a surface of each member on a side where X-rays are received is referred to as an upper surface, and a surface on the back side of the upper surface is referred to as a lower surface.

The radiation detector 100 is a direct-detection-type radiation sensor in which X-rays are directly incident on the single-crystal semiconductor substrate to be detected. The single-crystal semiconductor substrate of the radiation detector 100 is made of, for example, cadmium zinc telluride (CZT). The radiation detector 100 directly converts X-rays into an electric signal by applying a voltage to the single-crystal semiconductor substrate to bring the single-crystal semiconductor substrate into an easily ionized state. The radiation detector 100 has a thickness of, for example, 2000 μm to 3000 μm inclusive.

The detector unit 10 has at least two radiation detectors 100. In the example illustrated in FIGS. 1A and 1B, while the detector unit 10 includes two radiation detectors 100, the number thereof is not limited to this example.

The substrate 200 may be a mounting substrate such as a glass epoxy substrate or a glass composite substrate. The mounting substrate may be provided with various elements (such as a resistive element, a capacitive element, and a transistor) and circuits. The upper surface of the substrate 200 is connected to the lower surface of the radiation detector 100 by solder bumps 600. The lower surface of the substrate 200 is connected to the upper surface of the ASIC 300 by a substrate bonding part 610. The substrate 200 is preferably formed of a material having a higher thermal conductivity so as to dissipate heat generated from the ASIC 300.

As illustrated in FIG. 1A, when viewed from an upper surface side (side of a light-receiving surface) of the radiation detectors 100 in a plan view, the substrate 200 is disposed so as to be included within an area of the two radiation detectors 100 arranged in a planar manner.

The ASIC 300 is a semiconductor integrated circuit designed to perform a control operation of the radiation detectors 100 or processing on a signal from the radiation detectors 100. As illustrated in FIG. 1A, when viewed from the upper surface side (side of a light-receiving surface) of the radiation detectors 100 in a plan view, the ASIC 300 is disposed so as to be included within an area of the single radiation detector 100.

The ASIC 300 may be disposed so as to be included within an area excluding an area having a predetermined width along the periphery of the radiation detector 100. The predetermined width may be determined to be a width with which the ASIC 300 is not irradiated with radiation leaking from the periphery of the radiation detector 100 or from the boundary with the adjacent radiation detector 100. Alternatively, the predetermined width may be determined based on a thickness of the radiation detector 100, a kind of radiation to be irradiated, an incident angle of radiation, and the like.

The solder bumps 600 bonds the radiation detectors 100 and the substrate 200. Each of the solder bumps 600 is, for example, a low-temperature solder made of an alloy containing tin (Sn), silver (Ag), bismuth (Bi), or the like as a material. In order to avoid thermal damage and performance degradation of the radiation detectors 100, the melting point of the low-temperature solder is preferably less than 150° C.

The substrate bonding part 610 bonds the substrate 200 and the ASIC 300. In order to dissipate heat generated by the ASIC 300, the substrate bonding part 610 is preferably an adhesive having thermal conductivity.

According to Embodiment 1 described above, the ASIC 300 disposed on the lower surface side of the radiation detectors 100 is included within an area of the single radiation detector 100 when viewed from the upper surface side of the radiation detectors 100 in a plan view. From another point of view, the ASIC 300 does not have a portion located outside the radiation detector 100 when viewed from the upper surface side of the radiation detectors 100 in a plan view. In addition, the outer periphery of the ASIC 300 is entirely included within an area of the radiation detector 100 when viewed from the upper surface side of the radiation detectors 100 in a plan view. Thus, the ASIC 300 can be prevented from being irradiated with radiation leaking from the boundary and the periphery of the radiation detector 100. As a result, performance degradation and failures of the ASIC 300 are reduced.

Modification 1

A detector unit 10 according to Modification 1 will be described with reference to FIGS. 2A and 2B. In Modification 1, a plurality of ASICs 300 are disposed on the lower surfaces of the respective radiation detectors 100 of the detector unit 10. Differences from the above Embodiment 1 will be described.

Figure 2A:
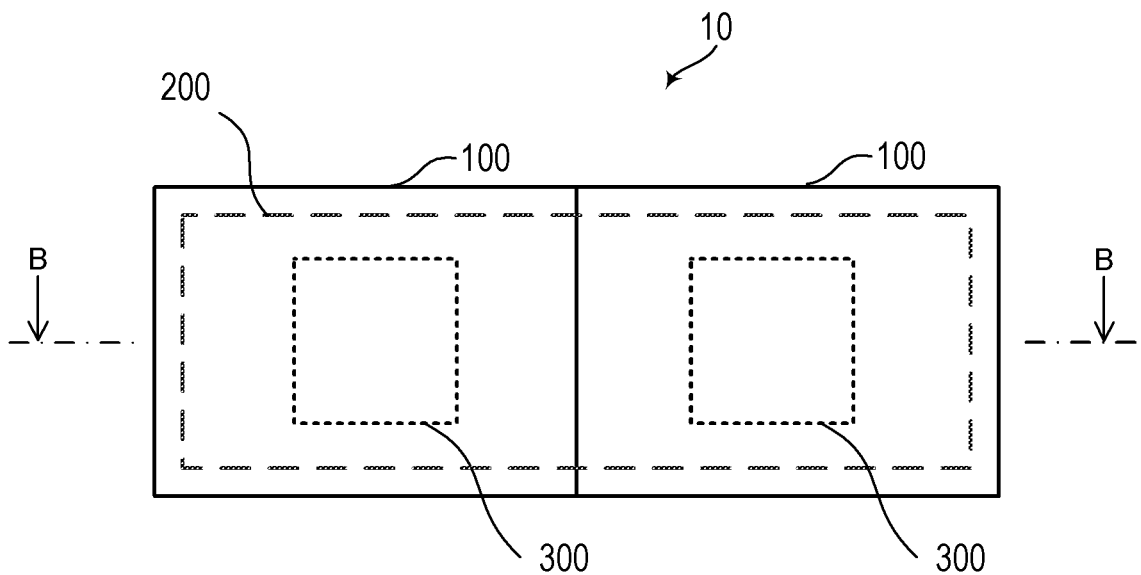
FIGS. 2A and 2B are schematic diagrams illustrating a configuration example of a detector unit according to Modification 1.
Figure 2B:
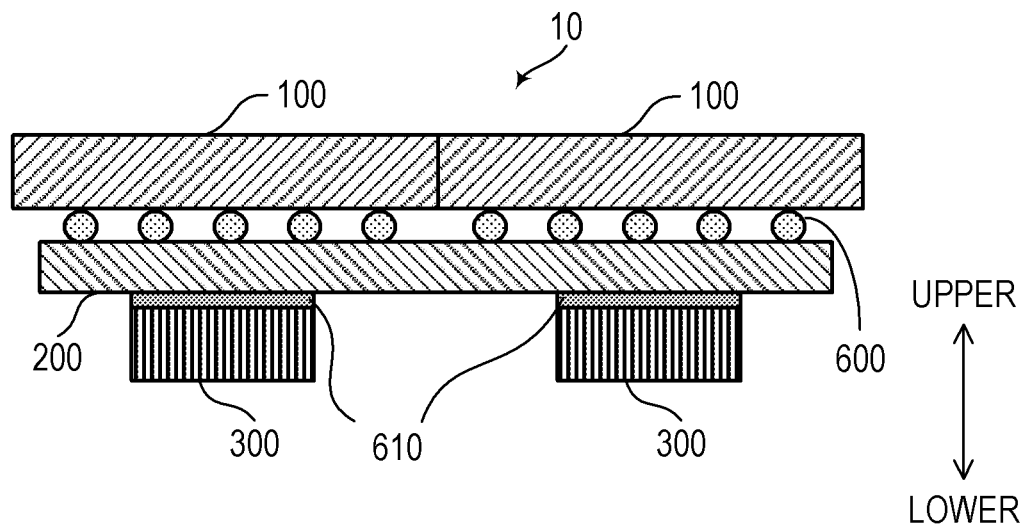

FIGS. 2A and 2B are schematic views illustrating a configuration example of the detector unit 10 according to Modification 1. FIG. 2A is an upper surface view of the detector unit 10. FIG. 2B is a sectional view of the detector unit 10, taken along a line B-B in FIG. 2A. The ASICs 300 disposed on the lower surfaces of the respective radiation detectors 100 may not have the same functions. Different functions may be implemented by different ASICs 300.

In a case where the ASIC 300 has a plurality of functions, these functions may be allocated to a plurality of ASICs 300, and the ASICs 300 implementing different functions may be disposed on the lower surface side of the respective radiation detectors 100. By allocating the functions to be separately implemented, the individual ASIC 300 can be reduced in size.

As illustrated in FIG. 2A, the ASIC 300 disposed on the lower surface of each of the radiation detectors 100 is arranged so as to be included within an area of the corresponding radiation detector 100 when viewed from the upper surface side in a plan view. Alternatively, as described with reference to FIGS. 1A and 1B, the ASIC 300 may be arranged so as to be included within an area excluding a predetermined width from the boundary and the periphery of the corresponding radiation detector 100.

Modification 2

A detector unit 10 according to Modification 2 will be described with reference to FIGS. 3A and 3B. In Modification 2, different types of semiconductor integrated circuits are disposed on the lower surfaces of the respective radiation detectors 100 included in the detector unit 10. Differences from the above Embodiment 1 and Modification 1 will be described.

Figure 3A:
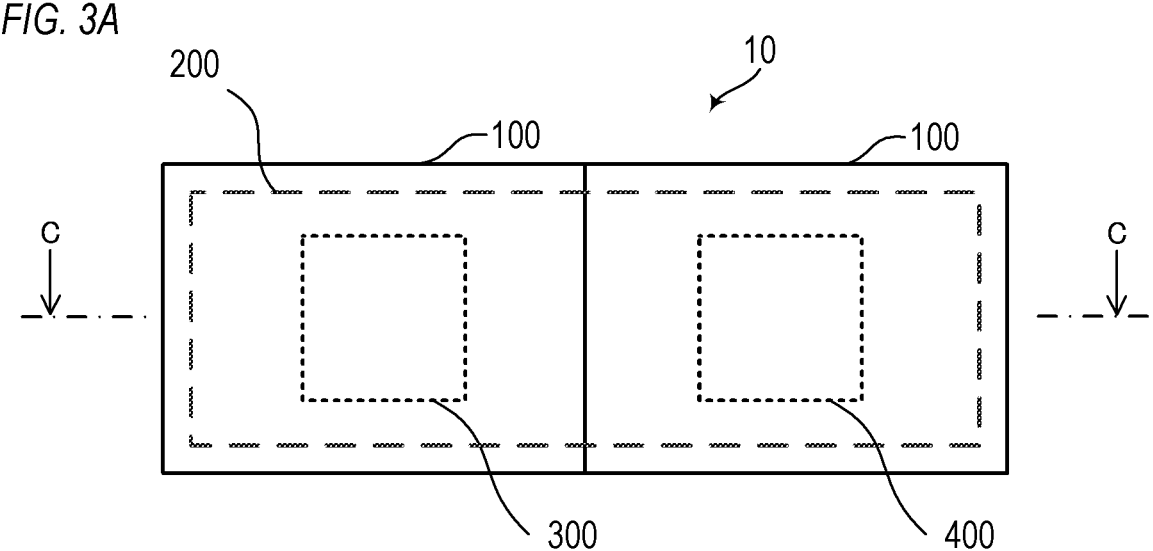
FIGS. 3A and 3B are schematic diagrams illustrating a configuration example of a detector unit according to Modification 2.
Figure 3B:
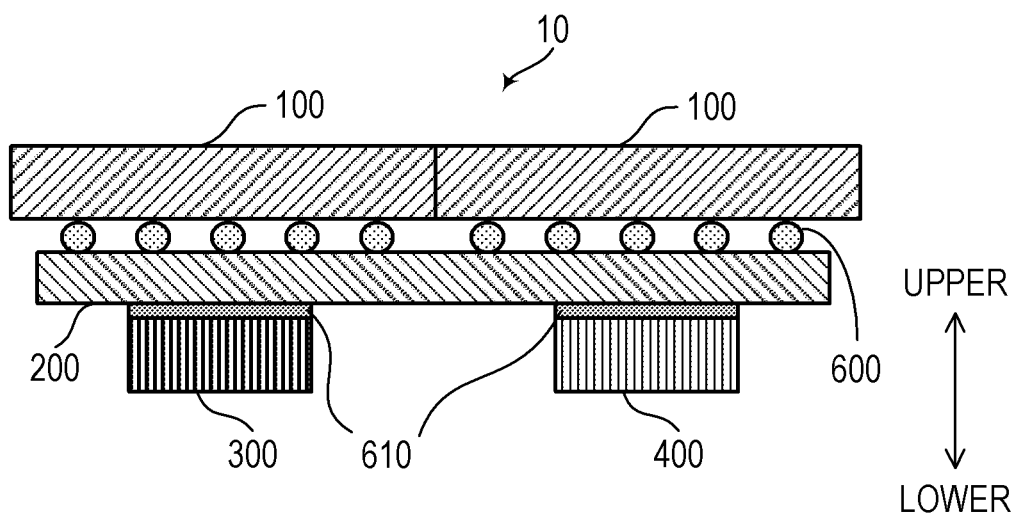

FIGS. 3A and 3B are schematic views illustrating a configuration example of the detector unit 10 according to Modification 2. FIG. 3A is an upper surface view of the detector unit 10. FIG. 3B is a sectional view of the detector unit 10, taken along a line C-C in FIG. 3A. In the example in FIG. 3B, an ASIC 300 and a low-dropout (LDO) regulator 400 are disposed on the lower surfaces of the respective radiation detectors 100. The LDO regulator 400 is a power supply circuit capable of outputting a constant voltage lower than an input voltage. The semiconductor integrated circuit disposed on the lower surface of the radiation detector 100 is not limited to the ASIC 300 or the LDO regulator 400 and may be a semiconductor integrated circuit having a different function represented by a semiconductor memory such as a dynamic random access memory (DRAM).

As illustrated in FIG. 3A, the ASIC 300 and the LDO regulator 400 disposed on the lower surfaces of the respective radiation detectors 100 are arranged so as to be included within respective areas of the corresponding radiation detectors 100 when viewed from the upper surface side in a plan view. Alternatively, as described with reference to FIGS. 1A and 1B, the individual ASIC 300 may be arranged to be included within an area excluding a predetermined width from the boundary and the periphery of the corresponding radiation detector 100.

Embodiment 2

In Embodiment 1, the semiconductor integrated circuit such as the ASIC 300 is connected to the radiation detector 100 via the substrate 200. In contrast, in Embodiment 2, a semiconductor integrated circuit is connected to a radiation detector 100 via an interposer.

As the number of bonding pads and signal lines increases, wiring and routing become complicated. In the case where a plurality of chips are tiled and used as in the radiation detector 100, routing of common signal lines such as a power line and output wiring becomes complicated. An interposer 500 can realize routing of complicated wiring with a thinner and finer pattern, compared to the case where routing is realized with multilayer wiring on the substrate 200. Thus, by connecting the radiation detector 100 and an ASIC 300 via the interposer 500, the radiation detection apparatus can be reduced in size so that packing density and area efficiency can be improved.

Figure 4A:
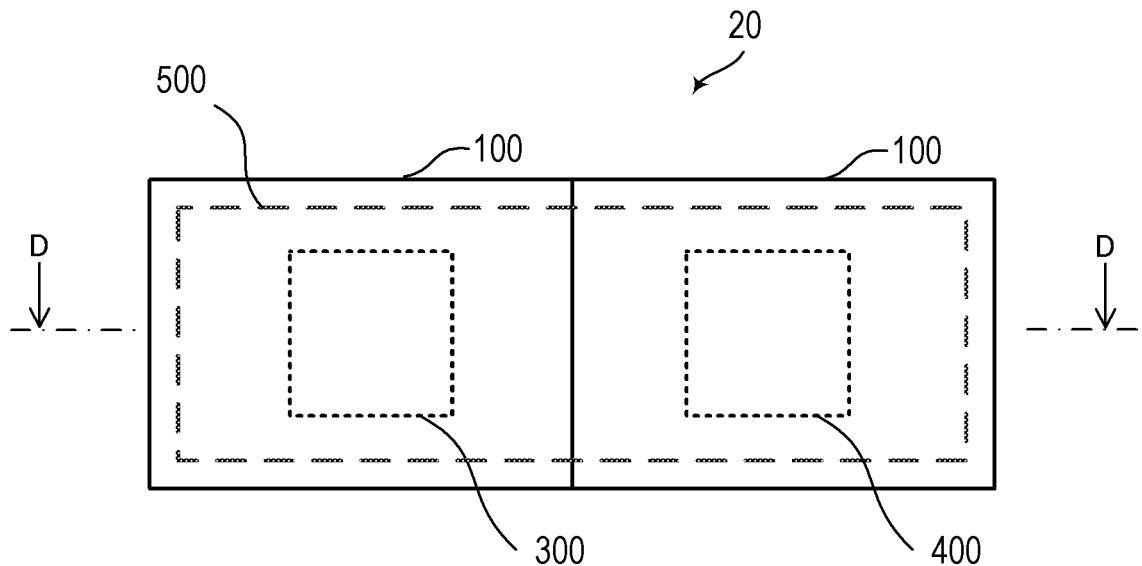
FIGS. 4A and 4B are schematic diagrams illustrating a configuration example of a detector unit according to Embodiment 2.
Figure 4B:
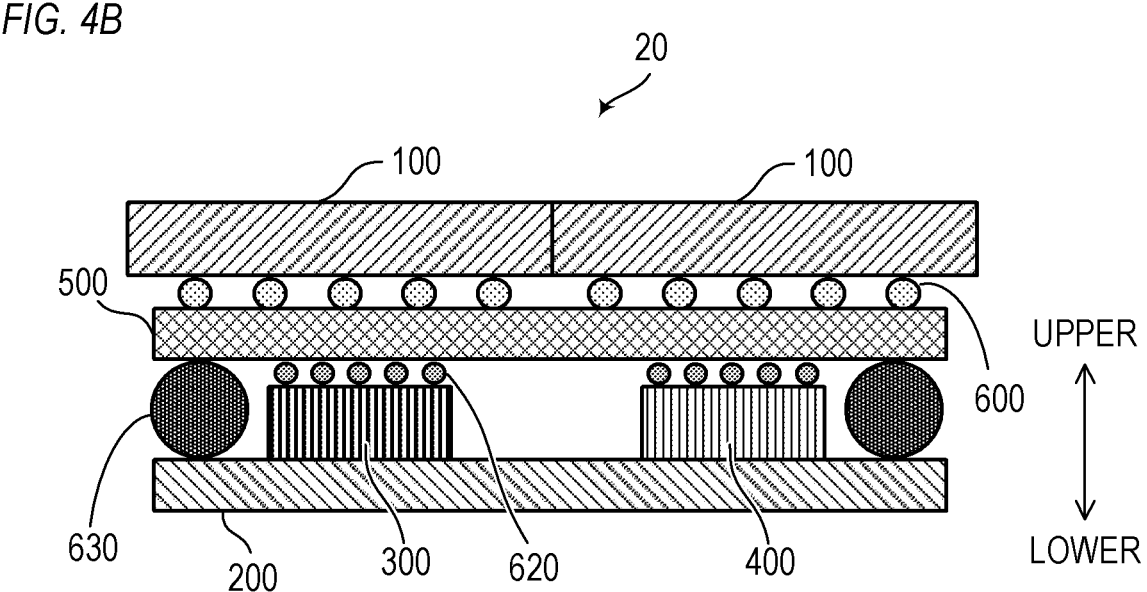

FIGS. 4A and 4B are schematic diagrams illustrating a configuration example of a detector unit 20 according to Embodiment 2. FIG. 4A is an upper surface view of the detector unit 20. FIG. 4B is a sectional view of the detector unit 20, taken along a line D-D in FIG. 4A.

The detector unit 20 includes radiation detectors 100, an interposer 500, an ASIC 300, an LDO regulator 400, and a substrate 200. In the following description, a surface of each member on a side where X-rays are received is referred to as an upper surface, and a surface on a back side of the upper surface is referred to as a lower surface.

The lower surfaces of the radiation detectors 100 are connected to the upper surface of the interposer 500 by solder bumps 600. The lower surface of the interposer 500 is connected to the upper surfaces of the ASIC 300 and the LDO regulator 400 by solder bumps 620. The lower surfaces of the ASIC 300 and the LDO regulator 400 are connected to the upper surface of the substrate 200. Further, the upper surface of the substrate 200 is connected to the lower surface of the interposer 500 by copper-core balls 630. Description of the same configuration as in Embodiment 1 will be omitted.

In Embodiment 1, a signal from the ASIC 300 is transmitted to a processing system in a subsequent stage via the substrate 200. In Embodiment 2, with the configuration illustrated in FIG. 4B, a signal from the ASIC 300 is transmitted to the substrate 200 via the interposer 500 and the copper-core balls 630 and is further transmitted to a processing system in a subsequent stage.

The interposer 500 may be made of not only a semiconductor material such as a silicon but also a material such as glass, polymer (flexible printed substrate), or ceramic. Each of the solder bumps 620 is, for example, a low-temperature solder made of an alloy containing tin (Sn), silver (Ag), bismuth (Bi), or the like. The copper-core ball 630 is formed, for example, by plating copper (Cu) with a low-temperature solder.

In Embodiment 2 described above, as in Embodiment 1, each of the semiconductor integrated circuits such as the ASIC 300 and the LDO regulator 400 is arranged so as to be included within an area of the corresponding single radiation detector 100. Thus, the semiconductor integrated circuit can be prevented from being irradiated with radiation leaking from the boundary and the periphery of the radiation detector 100. As a result, degradation and failures of the semiconductor integrated circuit are reduced.

Further, in Embodiment 2, by connecting the semiconductor integrated circuits to the radiation detectors 100 via the interposer 500, the radiation detection apparatus can be reduced in size so that packing density and area efficiency can be improved.

Embodiment 3

Figure 5:
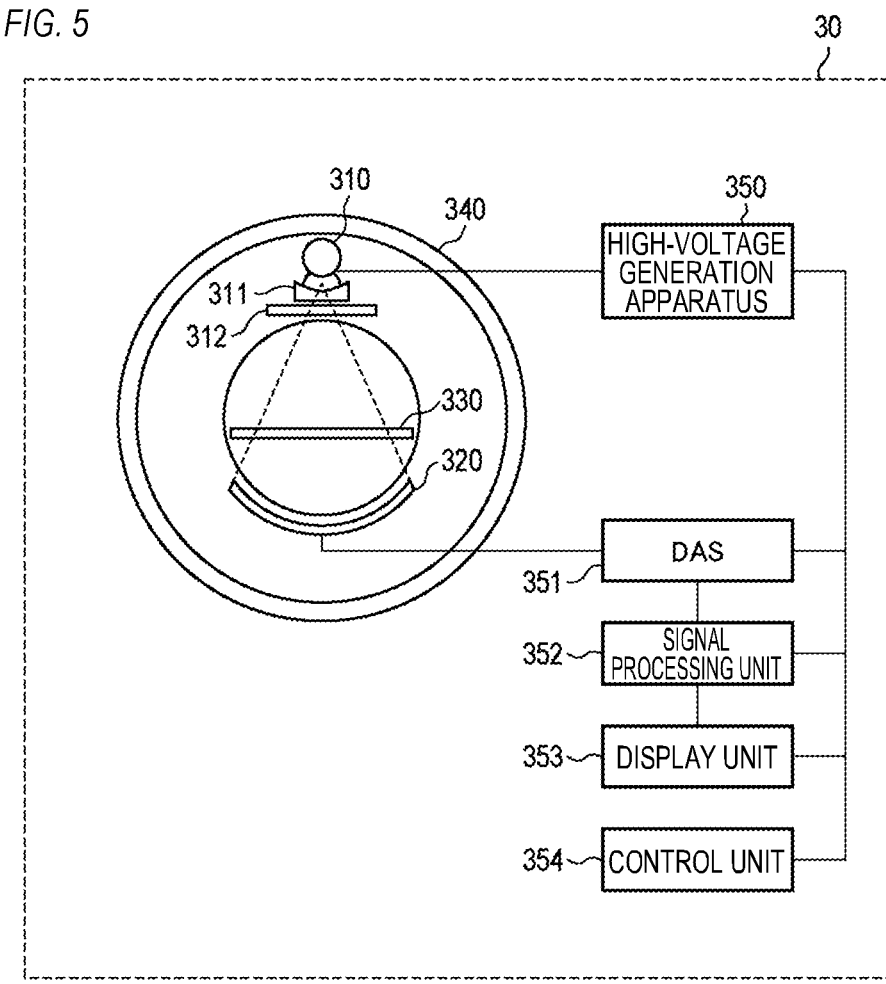
FIG. 5 is a block diagram illustrating an X-ray computed tomography (CT) apparatus.

The radiation detection apparatuses according to Embodiment 1 and Embodiment 2 can be applied to a detector of an X-ray CT apparatus. FIG. 5 is a block diagram illustrating an X-ray CT apparatus according to the present embodiment. An X-ray CT apparatus 30 according to the present embodiment includes an X-ray generation unit 310, a wedge 311, a collimator 312, an X-ray detection unit 320, a top plate 330, a rotating frame 340, a high-voltage generation apparatus 350, a data acquisition system (DAS) 351, a signal processing unit 352, a display unit 353, and a control unit 354.

The X-ray generation unit 310 includes, for example, a vacuum tube that generates X-rays. A high voltage and a filament current is supplied from the high-voltage generation apparatus 350 to the vacuum tube of the X-ray generation unit 310. X-rays are generated by irradiation of thermal electrons from a cathode (filament) toward an anode (target).

The wedge 311 is a filter that adjusts the amount of X-rays emitted from the X-ray generation unit 310. The wedge 311 attenuates the amount of X-rays so that the X-rays emitted from the X-ray generation unit 310 to a object have a predetermined distribution. The collimator 312 includes a lead plate or the like that narrows the irradiation range of the X-rays that have passed through the wedge 311. The X-rays generated by the X-ray generation unit 310 are shaped into a cone beam shape via the collimator 312 and reach the object on the top plate 330.

The X-ray detection unit 320 is configured using the radiation detection apparatus according to Embodiment 1 or Embodiment 2. The X-ray detection unit 320 detects X-rays that have been emitted from the X-ray generation unit 310 and passed through the object and outputs a signal corresponding to the amount of the X-rays to the DAS 351.

The rotating frame 340 has an annular shape and is configured to be rotatable. The X-ray generation unit 310 (the wedge 311, the collimator 312) and the X-ray detection unit 320 are arranged to face each other inside the rotating frame 340. The X-ray generation unit 310 and the X-ray detection unit 320 are rotatable together with the rotating frame 340.

The high-voltage generation apparatus 350 includes a booster circuit and outputs a high voltage to the X-ray generation unit 310. The DAS 351 includes an amplifier circuit and an A/D conversion circuit and outputs a signal from the X-ray detection unit 320 to the signal processing unit 352 as a digital signal.

The signal processing unit 352 includes a central processing unit (CPU), a read-only memory (ROM), and a random access memory (RAM) and is capable of performing image processing and the like on digital data. The display unit 353 includes a flat display device or the like and can display an X-ray image. The control unit 354 includes a CPU, a ROM, a RAM, and the like and controls the entire operation of the X-ray CT apparatus 30.

The embodiments (including the modifications) described above are merely examples, and configurations obtained by appropriately modifying or changing the above-described configurations within the scope of the gist of the present invention are also included in the present invention. Configurations obtained by appropriately combining the above-described configurations are also included in the present invention.

According to the present invention, it is possible to provide a radiation detection apparatus that reduces degradation and failures of the component due to exposure to radiation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-034569, filed on Mar. 7, 2023, which is hereby incorporated by reference herein in its entirety.

What is claimed is:

1. A radiation detection apparatus comprising:
   a direct-detection-type radiation detector provided in plurality and configured to be arranged in a planar manner; and
   a semiconductor integrated circuit configured to perform a control operation of the radiation detector or processing on a signal from the radiation detector,
   wherein the radiation detector and the semiconductor integrated circuit are connected via a mounting substrate,
   wherein the mounting substrate is connected to the plurality of the radiation detectors and is disposed so as to be superimposed within areas of the plurality of the radiation detectors in a plan view viewed from a side of a light-receiving surface of the plurality of the radiation detectors, and
   wherein the semiconductor integrated circuit is disposed on a back side of the light-receiving surface so as to be included within a partial area of one of the plurality of the radiation detectors and a partial area of the mounting substrate in the plan view.

2. The radiation detection apparatus according to claim 1, wherein the mounting substrate is a glass epoxy substrate or a glass composite substrate.

3. The radiation detection apparatus according to claim 1, wherein, when viewed from a side of the light-receiving surface of the radiation detector in a plan view, the semiconductor integrated circuit is disposed so as to be included within an area excluding an area having a predetermined width along a periphery of the radiation detector.

4. The radiation detection apparatus according to claim 3, wherein the predetermined width is determined based on at least any of a thickness of the radiation detector, a kind of radiation to be irradiated, and an incident angle of radiation.

5. The radiation detection apparatus according to claim 1, wherein the semiconductor integrated circuit is provided in plurality to implement different functions, and the plurality of the semiconductor integrated circuits are arranged to each of the plurality of the radiation detectors.

6. The radiation detection apparatus according to claim 1, wherein the radiation detector has a thickness of 2000 µm to 3000 µm inclusive.

7. The radiation detection apparatus according to claim 1, wherein the radiation detector includes a single-crystal semiconductor substrate and the single-crystal semiconductor substrate includes cadmium telluride.

8. The radiation detection apparatus according to claim 1, wherein the radiation detector includes a single-crystal semiconductor substrate and the single-crystal semiconductor substrate includes cadmium zinc telluride.

9. The radiation detection apparatus according to claim 1, wherein the radiation detector includes a single-crystal semiconductor substrate and the single-crystal semiconductor substrate includes any of lead iodide, mercuric iodide, bismuth iodide, and thallium bromide.

10. An X-ray computed tomography apparatus comprising:
    an X-ray generation unit;
    the radiation detection apparatus according to claim 1 configured to detect X-rays emitted from the X-ray generation unit; and
    a signal processing unit configured to process a signal output from the radiation detection apparatus.

11. A radiation detection apparatus comprising:
    a direct-detection-type radiation detector provided in plurality and configured to be arranged in a planar manner;
    a semiconductor integrated circuit configured to perform a control operation of the radiation detector or processing on a signal from the radiation detector; and
    an interposer,
    wherein the radiation detector and the semiconductor integrated circuit are connected via the interposer,
    wherein the interposer is connected to the plurality of the radiation detectors and is disposed so as to be superimposed within areas of the plurality of the radiation detectors in a plan view viewed from a side of a light-receiving surface of the plurality of the radiation detectors, and
    wherein the semiconductor integrated circuit is disposed on a back side of the light-receiving surface so as to be included within a partial area of one of the plurality of the radiation detectors and a partial area of the interposer in the plan view.

* * * * *